United States Patent
Castagna et al.

(10) Patent No.: US 9,151,915 B2
(45) Date of Patent: Oct. 6, 2015

(54) OPTICAL INTERPOSER WITH COMMON ANGLED SURFACE

(75) Inventors: Lou Castagna, Middletown, PA (US); Richard Dean Miller, Lancaster, PA (US); Robert Nelson Fair, Jr., York, PA (US); Timothy John Loftus, Shiopensburg, PA (US); Terry Patrick Bowen, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 255 days.

(21) Appl. No.: 13/172,259

(22) Filed: Jun. 29, 2011

(65) Prior Publication Data

US 2013/0004118 A1    Jan. 3, 2013

(51) Int. Cl.
  *G02B 6/12* (2006.01)
  *G02B 6/42* (2006.01)
  *G02B 6/36* (2006.01)

(52) U.S. Cl.
  CPC ........... *G02B 6/4214* (2013.01); *G02B 6/3636* (2013.01); *G02B 6/3652* (2013.01); *G02B 6/3684* (2013.01); *G02B 6/3692* (2013.01); *G02B 6/423* (2013.01); *G02B 6/4228* (2013.01); *G02B 6/4249* (2013.01)

(58) Field of Classification Search
  CPC ...... G02B 6/122; G02B 6/4214; G02B 6/423; G02B 6/3636; G02B 6/3692; G02B 6/4249
  USPC ............... 385/14–15, 31, 39–40, 129–132
  See application file for complete search history.

(56) References Cited

U.S. PATENT DOCUMENTS

| 4,943,130 | A  | * | 7/1990  | Dannoux et al. ........... 385/14 |
| 4,979,970 | A  | * | 12/1990 | Dannoux et al. ........... 385/14 |
| 5,896,481 | A  | * | 4/1999  | Beranek et al. ........... 385/90 |
| 6,389,202 | B1 |   | 5/2002  | Delpiano et al. |
| 6,828,606 | B2 | * | 12/2004 | Glebov ............... 257/244 |
| 6,955,481 | B2 | * | 10/2005 | Colgan et al. ............ 385/89 |
| 6,987,906 | B2 | * | 1/2006  | Nakama et al. ........... 385/31 |
| 7,065,283 | B2 | * | 6/2006  | Steinberg et al. .......... 385/137 |

(Continued)

FOREIGN PATENT DOCUMENTS

| CN | 100460911 C | 2/2009 |
| CN | 101520530 A | 9/2009 |
| CN | 101750674 A | 6/2010 |
| KR | 1020040036409 A | 4/2004 |

OTHER PUBLICATIONS

International Search Report, International Application No. PCT/US2012/044489, International Filing Date Jun. 28, 2012.

(Continued)

*Primary Examiner* — Ryan Lepisto
*Assistant Examiner* — Guy Anderson

(57) ABSTRACT

An interposer comprising a plurality of optical conduits, each having an optical axis, a substrate defining a plurality of grooves having a terminal end, each optical conduit being disposed in a single groove, and a common angled surface traversing two or more of the grooves at the terminal end, at least a portion of the angled surface proximate the optical axes of the optical conduits in the two or more grooves is reflective, and one or more optical components disposed above the angled surface, the optical components and the optical conduits being optically coupled by the angled surface.

19 Claims, 4 Drawing Sheets

(56) References Cited

U.S. PATENT DOCUMENTS

| | | |
|---|---|---|
| 7,306,378 B2 | 12/2007 | Alduino et al. |
| 7,511,258 B2 | 3/2009 | Bowen et al. |
| 8,548,284 B2 | 10/2013 | Warashina et al. |
| 8,827,572 B2 | 9/2014 | Zhou |
| 2004/0206988 A1* | 10/2004 | Glebov ................ 257/244 |
| 2004/0228600 A1* | 11/2004 | Steinberg et al. ........... 385/137 |
| 2006/0239605 A1* | 10/2006 | Palen et al. ................ 385/14 |
| 2007/0224735 A1* | 9/2007 | Karashima et al. .......... 438/128 |
| 2008/0175530 A1* | 7/2008 | Song et al. ................ 385/14 |
| 2010/0142886 A1* | 6/2010 | Warashina et al. .......... 385/14 |

OTHER PUBLICATIONS

CN State Intellectual Property Office, Search Report issued Dec. 22, 2014 in CN Patent Application 201280032748.9 (counterpart to the present US application).

CN State Intellectual Property Office, Office Action issued Dec. 22, 2014 in CN Patent Application 201280032748.9 (counterpart to the present US application).

* cited by examiner

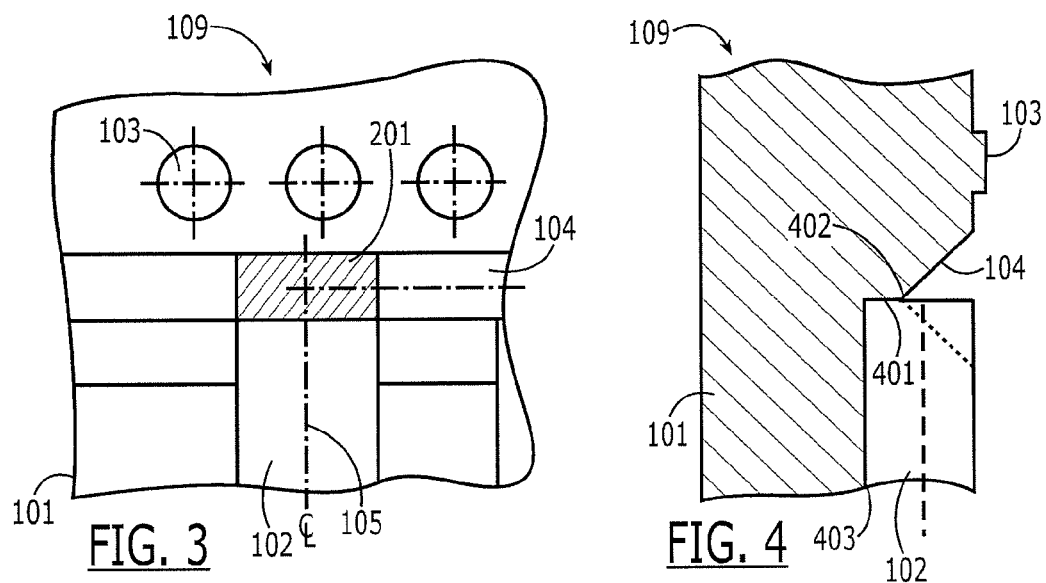
FIG. 3
FIG. 4
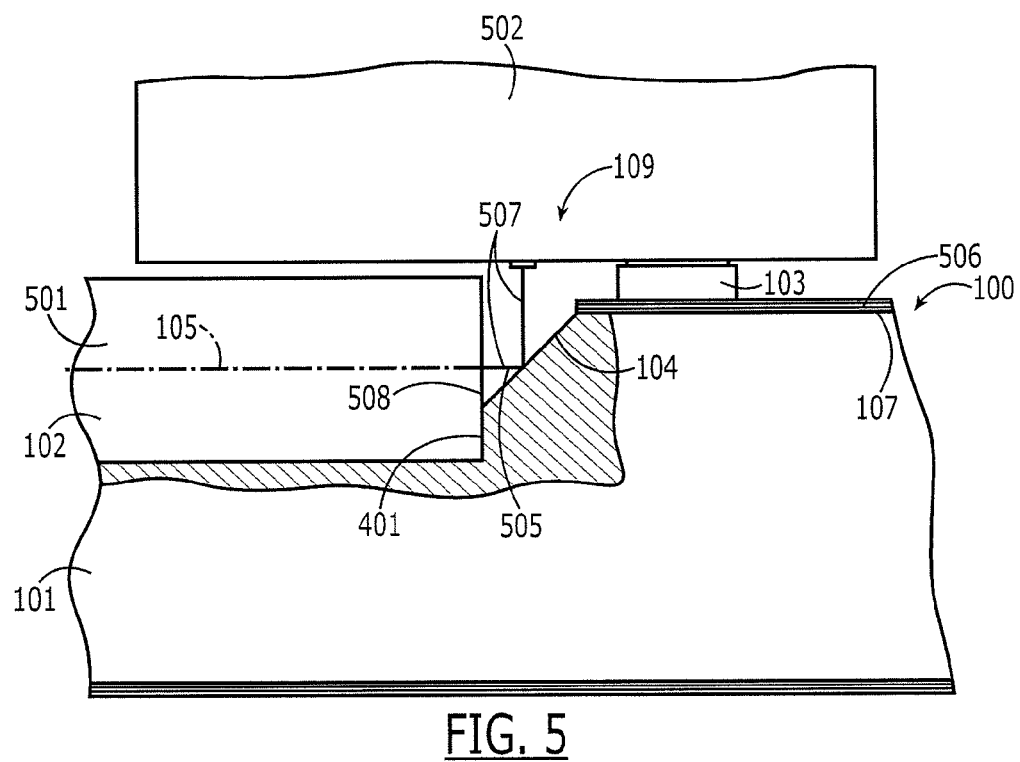
FIG. 5

OPTICAL INTERPOSER WITH COMMON ANGLED SURFACE

FIELD OF INVENTION

The subject matter herein relates generally to fiber optic substrates, and more particularly, to an interposer with a common reflective surface for optically coupling the optical components such as opto-electric devices, with the optical conduits, such as optical fibers.

BACKGROUND OF INVENTION

Fiber optics are used in a wide variety of applications. The use of optical fibers as a medium for transmission of digital data (including voice data) is becoming increasingly more common due to the high reliability and large bandwidth available with optical transmission systems. Fundamental to these systems are optical subassemblies for transmitting and/or receiving optical signals.

Optical subassemblies typically comprise an interposer. As used herein, an "interposer" functions as a substrate for optical, opto-electrical, and electrical components and provides interconnections to optically and/or electrically interconnect the optical/opto-electrical/electrical components. For example, a typical interposer may comprise a substrate, for example, silicon, having one or more grooves formed therein for securing an optical fiber. The conventional groove is formed in the shape of a "V" by wet etching the substrate to include two sidewalls that retain the optical fiber along its length. The interposer also comprises an optical component such as an optoelectric device (OED), and the substrate holds the fiber and optical component in such a way as to optically couple the two.

Typically, an interposer also comprises a reflective surface for optically coupling the fiber or waveguide with the optical component. That is, typically the fibers are laid parallel to the substrate in the grooves mentioned above while the optical axes of the OEDs are typically perpendicular to the substrate. Accordingly, an angled surface is required to bend the light between the perpendicular optical axes of the fiber/waveguide and the OED.

There are a number of different approaches for providing the above-mentioned reflective surface. For example, in U.S. application Ser. No. 12/510,954 (incorporated herein by reference), the angled surface is not on the substrate, but rather defined on the end of the fiber. That application recognizes that wet etching techniques do not provide the optimum angle to reflect light between perpendicular axes. That is, wet etching in silicon results in an angle of 54.7° and not the optimum 45° angle. Thus, rather than defining the angled surface in the substrate, U.S. application Ser. No. 12/510,954 discloses a technique for optimizing the end face of the fiber to provide the angled surface. In an alternative approach, application Ser. No. 13/013,402 (incorporated herein by reference) discloses using dry etching techniques to form a 45° surface in the substrate thereby simplifying the end face of the fibers. Angles obtained by dry etching are not limited to the crystalline structure of the substrate. Once the facet is defined on the substrate, it may be metal coated or otherwise rendered reflective using known techniques.

Although both approaches provide significant advantages over the prior art, Applicants have identified the need for an approach which uses a common angled surface coated with a reflective material to couple the light between optical conduits (e.g., fibers or waveguides) and optical components (e.g., an array of OEDs) to realize economies of scale and consistency across the fiber channels. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides an interposer that functions as a substrate for securing optical and/or opto-electrical components while providing a common angled surface for optically coupling multiple optical conduits with multiple optical components. Specifically, Applicants recognize that wet etching an angled surface is limited by the crystalline configuration of the substrate such that only certain angles typically are possible. For example, in a silicon substrate, traditional wet etching will result in a V-groove having a wall slope of 54.7° as mentioned above. Although dry etching is not limited by the crystalline configuration of the substrate and essentially any angle can be etched, Applicants have found that the intersection of the grooves with the angled surface presents compound angles which are problematic for dry etching. In other words, the compound angles at the junction of the angled surface and the grooves cannot be readily etched using dry etching techniques. Applicants have overcome this problem by using a machining approach, rather than an etching approach with respect to the angled surface. Accordingly, a common angled surface is machined across the grooves and thus, the terminal ends of the grooves can be fashioned with an angled surface in one, readily-performed step.

By machining a common angled surface across the grooves in one step, economies of scale are realized and continuity among the different angled surfaces is essentially guaranteed. In one embodiment, the angled surfaces are defined in the substrate prior to the substrate being diced from the wafer in which they are formed. In such an embodiment, the dicing wheel may cut across not only the grooves on a substrate, but cut across the grooves on different substrates in one process step. Again, further realizing economies of scale and reducing the cost and consistency of producing angled surfaces in the substrates.

In light of the above, one aspect of the invention is an interposer comprising a configurable angled surface for optically coupling the fiber with an optical component. In one embodiment, the interposer comprises a substrate having (a) a plurality of grooves having a terminal end, each optical conduit being disposed in a single groove; and (b) a common angled surface traversing two or more of said grooves at said terminal end, at least a portion of the angled surface is treated to be reflective.

Another aspect of the invention is a subassembly comprising the interposer integrated with an optical component and fiber. In one embodiment, the subassembly comprises: (a) a plurality of optical conduits, each having an optical axis; (b) a substrate defining a plurality of grooves having a terminal end, each optical conduit being disposed in a single groove; (c) a common angled surface traversing two or more of said grooves at said terminal end, at least a portion of the angled surface proximate the optical axes of the optical conduits in said two or more grooves is treated to be reflective; and (d) one or more optical components disposed above said angled surface, said optical components and said optical conduits being optically coupled by said angled surface.

Another aspect of the invention is a process of preparing the interposer. In one embodiment, the process comprises: (a) etching grooves in a substrate to receive an optical conduit, said grooves defining a termination end in said substrate; and (b) machining an angled surface across two or more of said grooves at their terminal ends.

BRIEF DESCRIPTION OF DRAWINGS

FIG. 3 shows a detailed view of a terminal end of the groove of FIG. 2

FIG. 4 shows a side view of the terminal end of the groove shown in FIG. 3.

FIG. 5 shows a cross section of the interposer of FIG. 1 combined with an optical conduit and an OED.

FIG. 6b shows a side view of the machining step shown in FIG. 6a.

DETAILED DESCRIPTION

Figure 1:
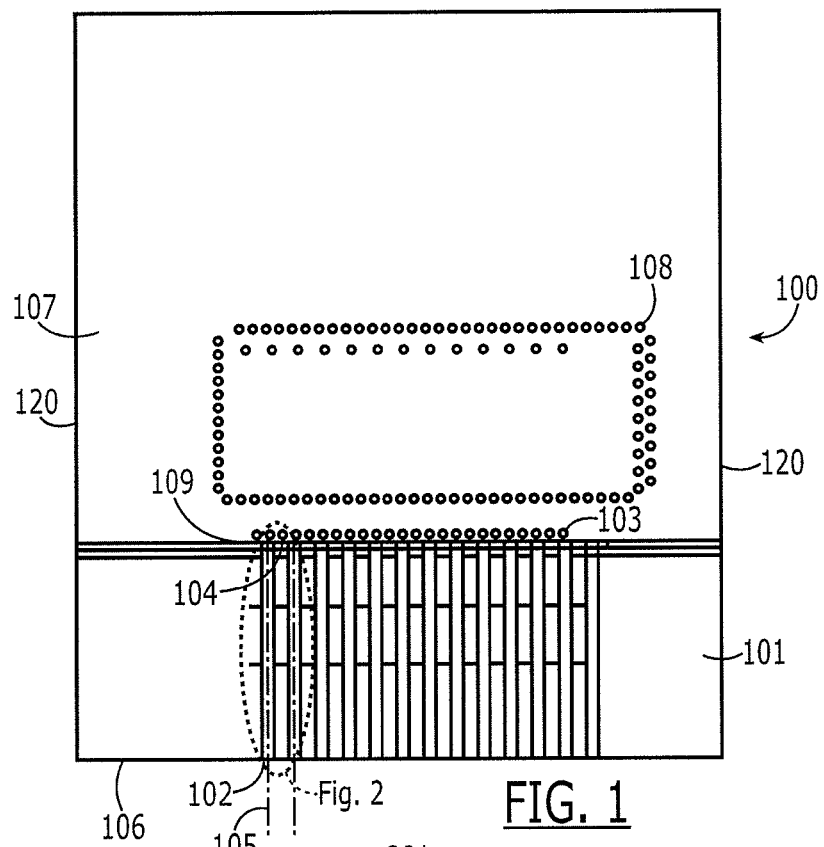
FIG. 1 shows an interposer of the present invention.
Figure 2:
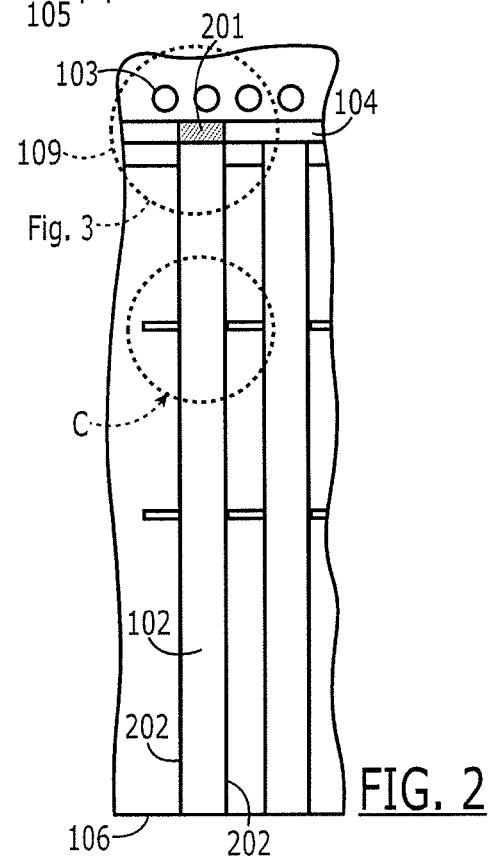
FIG. 2 shows a detailed view of the groove of the interposer of FIG. 1.

Referring to FIGS. 1-4, one embodiment of an optical interposer 100 of the present invention is shown. The optical interposer 100 comprises a substrate 101 having a top planar surface 107 and at least one groove 102 defined in the top planar surface, extending from an edge 106 of the substrate to a terminal end 109. The terminal end 109 comprises a common angled surface 104, which in this embodiment, is perpendicular to the groove 102. The common angled surface 104 traverses two or more of said grooves. In this particular embodiment, the angled surface 104 traverses all of the grooves of the interposer 100. A reflective coating is deposited on at least a portion 201 of the angled surface 104. Each of these elements and a few alternative embodiments are described in greater detail below.

A primary function of the interposer is to provide a substrate or backbone to support and secure the fiber, optical component(s) and supporting electrical circuitry. To this end, it should comprise a rigid material that can be etched or machined to define the grooves and is thermally stable, suitable for being heated to temperatures typical in solder reflow applications. Examples of suitable materials include elemental materials having a crystalline form, polymeric material, glass, ceramics (i.e., oxides, nitrides, carbides, borides and silicides of metals or semi-metals and combinations thereof), quartz, and metals.

In one embodiment, the parallel side walls 202 (FIG. 2) of the groove hold the optical conduit in place. (Although single fiber applications are shown and described herein, it should be appreciated that the invention is not limited to single fiber applications and may be applied to arrays of fibers, ribbon fiber, and planar waveguides.) The sidewalls may be the walls of a traditional V-groove, or they may be perpendicular to the top planar surface such that they form more of a U-groove. Wet or dry etching may be used to form grooves, although dry etching can be used to form any side wall configuration because the etching process is not dependent on the crystalline structure of the substrate.

An important aspect of the present invention is the common angled surface spanning two or more grooves. As mentioned above, wet etching an angled surface is limited by the crystalline configuration of the substrate such that only certain angles typically are possible. For example, in a silicon substrate, traditional wet etching will result in a V-groove having a wall slope of 54.7° as mentioned above. Although dry etching is not limited by the crystalline configuration of the substrate and essentially any angle can be etched, Applicants have found that the intersection of the grooves with the angled surface presents compound angles which are problematic for dry etching. In other words, the compound angles at the junction of the angled surface and the grooves cannot be readily etched using dry etching techniques. Applicants have overcome this problem by using a machining approach rather than an etching approach with respect to the angled surface. As is discussed more fully with respect to FIGS. 6a-c and 7a-c, a common angled surface is machined across the grooves and thus, the terminal ends of the grooves can be fashioned with an angled surface in one, readily-performed step.

Because machining is not limited or controlled by the crystalline structure of the underlying substrate, it can be used to produce a common angled surface of any desired angle. Accordingly, in one embodiment, the angled surface 104 is configured with an optimum angle to result in efficient optical coupling between the optical component and the core of the fiber. Generally, although not necessarily, this angle will be about a 45° angle if the optical axes of the fiber and optical component are at right angles.

At least a portion 201 (FIG. 2) of the angled surface is treated to make it reflective. Because the common angled surface 104 traverses across multiple grooves, only the portion along the optical axis 105 of the optical conduit needs to be treated to be reflective. However, in some embodiments, it may be easier or cost effective to treat the entire angled surface 104 to make it reflective. In one embodiment, treating the surface involves coating it with a metal or other reflective material as is known in the art. Suitable reflective materials include, for example, gold, silver, aluminum and dielectrics. The materials may be deposited on the facets using known techniques, including, evaporation, sputtering and vapor deposition.

Referring to FIG. 4, a cross sectional view of a terminal end 109 of a groove 102 is shown. In this embodiment, a step 401 is formed just below the angled surface 104. Such a step may be formed in different ways, although it is most readily formed by machining the angled surface such that its lower edge 402 is below the optical axis 105, but above the bottom 403 of the groove 102 as shown. This step 401 may be used as a stop for the fiber to enhance its axially positioning/alignment in the groove 102 as described below.

Referring to FIG. 5, a sectional view of an assembled interposer 500 is shown. As shown, the interposer 500 comprises the substrate 101 defining multiple grooves 102 on the top surface 107 on the substrate 101. In each groove 102 is disposed an optical conduit 501 having an optical axis 105. A common angled surface 104 traverses two or more grooves. At least a portion of the angled surface at the optical axis 105 is treated to be reflective. On the top surface 107 of the substrate are solder pads 103 upon which are disposed multiple optical components, which, in this particular embodiment, are OEDs 502. The OEDs are connected through the solder pads to conductive traces 506 in the substrate 101, which, in turn, are connected to the integrated circuits (not shown) on the substrate for driving the OEDs. As shown, the optical conduit 501 is optically coupled to the OED 502 along an optical path 507 by a reflective angled surface 104.

Although an optical fiber is shown in the embodiment of FIG. 5, it should be understood that any optical conduit may be used. Suitable optical conduits include, for example, discrete fibers, ribbon fibers, and planar waveguides. The use of such planar waveguides is known and is described for example in application Ser. No. 13/017,668 (hereby incorporated by reference.)

In some embodiments, it may be preferable in certain applications to reduce the air gap between the optical conduit and the common angled surface to enhance the effectiveness of the optical coupling. Reducing the air gap may be achieved in different ways. For example, in one embodiment, the fiber end face is profiled to comport with the angled surface 104. Accordingly, in one embodiment, the fiber end face is configured to have the same angle as that of the angled surface 104. (It may be desirable in certain applications to further profile the end face of the fiber for additional optical performance and/or passive alignment. For example, side facets may be added to the fiber end face on either side of the first mating facet to enhance optical coupling (see, for example, U.S. application Ser. No. 12/510,954).)

Although physical contact between the first mating face of the fiber and the angled surface of the terminal end may be desirable, it is not necessary, and, in certain applications, a space may be desired to facilitate manufacturability. For example, referring to FIG. 5, an embodiment of the interposer of the present invention is shown in which the fiber 501 has a non-profiled end face 508. In other words, the end face is perpendicular to the fiber. This embodiment offers certain advantages over the profiled fiber end face. In particular, end faces that are normal to the optical axis are relatively easy to manufacture and can be prepared using standard mechanical cleaving or laser cleaving techniques. Additionally, the perpendicular non-profiled end face lends itself to passive axial alignment. More specifically, as shown in FIG. 5, the fiber 501 is disposed in the groove 102 such that the non-profiled fiber end face 508 abuts the step 401 to axially align the fiber in the interposer. In addition to improved manufacturability due to the non-profiled fiber end face 508 and good axial alignment due to the step 401 abutting the fiber end face 508, the embodiment of FIG. 5 also has the benefit of a relatively short optical path 507 between the fiber end face 508 and the angled surface 104 because the lower portion of the angled surface is truncated by groove 102. That is, by machining the common angled surface 104 above the bottom of the groove 102, the core of the fiber can be closer to the angled surface. The shortened optical path reduces light diffusion and thus improves optical coupling. Therefore, the configuration of the groove and angled surface shown in FIG. 5, not only produces a step for axial registration of the fiber in the groove, but also shortens the angled surface allowing the core of the fiber to get closer to the angled surface.

Nevertheless, it should be understood that because there is an air gap between the non-profiled end face 508 and the angled surface 104, optical performance may still be comprised to some degree. However, this gap may be filled with an optically index matching transparent gel or similar substance to improve or enhance the optical coupling between the fiber 501 and the OED 502 disposed above the terminal end 109 of the groove 102.

The fiber may be secured to the groove in a variety of known ways. For example, the fiber may be metalized and soldered in place or it may be glued in place. In one embodiment, a UV-cured, optically transparent adhesive is used to secure the fiber in the groove. Such an approach may be preferable to reduce Fresnel losses, as any gaps between the optical component, the terminal end of the groove and the end face of the fiber would be filled with the optically transparent adhesive.

The optical component may be any known component that is optically coupled to a fiber. The optical component may be for example (a) a passive component, which does not convert optical energy to another form and which does not change state (e.g., fiber, lens, add/drop filters, arrayed waveguide gratings (AWGs), GRIN lens, splitters/couplers, planar waveguides, or attenuators); (b) an OED which converts between optical energy and electrical energy (e.g., lasers, such as vertical cavity surface emitting laser (VCSEL), double channel, planar buried heterostructure (DC-PBH), buried crescent (BC), distributed feedback (DFB), distributed bragg reflector (DBR); light-emitting diodes (LEDs), such as surface emitting LED (SLED), edge emitting LED (ELED), super luminescent diode (SLD); and photodiodes, such as P Intrinsic N (PIN) and avalanche photodiode (APD)); or (c) a hybrid device which does not convert optical energy to another form but which changes state in response to a control signal (e.g., switches, modulators, attenuators, and tunable filters). It should also be understood that the optical component may be a single discrete device or it may be assembled or integrated as an array of devices.

The optical component has at least one optical axis along which the light propagates to/from the optical component. Because the optical component is disposed over the fiber and optically coupled thereto by virtue of the reflective angled surface defined in the interposer, generally, although not necessarily, the optical axis is essentially perpendicular to the planar surface. It should be understood that the optical component is not limited to a single optical axis. For example, in the embodiment shown in FIG. 5, the optical component is either a VCSEL array or a PIN array, in which the optical component has multiple optical axes.

The interposer may also have circuitry (electrical/optical) for providing the necessary interconnections for supporting the optical component. For example, referring to FIG. 1, the interposer 100 comprises solder pads 103 for electrically connecting an OED and solder pads 108 for electrically connecting an integrated circuit. The pads 103 and 108 are interconnected with electrical traces (not shown for simplicity). Additionally, other traces (again, not shown for simplicity) electrically connect the integrated circuit to substrate vias (not shown) along the perimeter of the interposer 100. The substrate vias then interface the interposer electrically with the higher level flex circuit or printed circuit board through contact pads. This is a known technique.

The interposer of the present invention also comprises features for passively aligning the fiber and the optical component. One of the primary technical challenges associated with the manufacture of optical assemblies, especially systems offering higher levels of integration, is component optical alignment. This is especially applicable in free-space, interconnect optical systems where discrete optical components, such as active devices (e.g., semiconductor lasers), passive devices (e.g., filters), and/or MOEMS (micro-optical electromechanical systems) (e.g., tunable filters and switches) are integrated on a common mounting system to exacting tolerances, typically in the sub-ten micrometer down to sub-micrometer range.

There are generally two alignment approaches for aligning optical components—active and passive. In passive alignment, registration or alignment features are typically fabricated directly on the components as well as on the platform to which the components are to be mounted. The components are then positioned on the platform using the alignment features and affixed in place. In active alignment, the optical components are placed on the platform, but before being affixed thereto, an optical signal is transmitted through the components while they are manipulated to provide optimum optical performance. Once optimum performance is achieved, the components are affixed to the platform. Although active alignment tends to be more precise than passive alignment, passive alignment facilitates high-speed, high-volume automated manufacturing and, thus, is preferred. It tends to be exceedingly difficult, however, to optically align in all three axes using passive alignment, especially if exceptionally good alignment is required. Nevertheless, a significant reduction in manufacturing time and costs can be realized if passive alignment can be used to achieve acceptable alignment along two axes or even one so that active alignment is only necessary for the remaining axes or for fine tuning.

The interposer of the present invention may have a number of features to facilitate passive alignment of the fiber and/or optical component. For example, as already mentioned above, to facilitate passive alignment of the fiber in the interposer, in one embodiment, the terminal end 109 defines a step 405 to axially align the optical fiber in the groove 102. In one embodiment, the interposer also has fiducials to facilitate passive alignment of the optical component 502 such that each of its optical axes is aligned with its respective optical path 507. Fiducials may be any structure or marking which provides for the passive alignment of the optical component. A variety of fiducials may be used. In one embodiment, a pattern of contact pads are used that passively align the optical component during a reflow operation. Specifically, the optical component is provided with a certain pattern of contact pads on its bottom, the interposer has the same pattern on its top planar surface. The optical component is then placed on the pads in rough alignment using known pick and place technology. Alignment between the interposer and optical component is then achieved when the assembly is reflowed such that the surface tension of the contact pads causes the patterns of the optical component to align over the pattern on the interposer, thereby precisely positioning the optical component relative to the grooves of the interposer. Such a mechanism is well known and disclosed for example in U.S. Pat. No. 7,511,258, incorporated herein by reference.

In another embodiment, rather than or in addition to contact pads, other fiducials on the interposer are used to facilitate passive alignment. For example, the fiducials may be physical structures protruding from the planar surface that provide a register surface against which the edge of the optical component may contact to be positioned correctly on the interposer. Alternatively, the fiducials may be markings to enable visual alignment of the optical component on the interposer using a commercially-available, ultra-high precision die bonding machine, such as, for example, a Suss MicroTec machine (See, e.g., U.S. Pat. No. 7,511,258).

Additionally, a combination of fiducials and contact pads may be used. For example, the pads may be used to pull the optical component into contact with the raised fiducials of the interposer. Still other alignment techniques will be apparent to one of skill in the art in light of this disclosure.

Therefore, the interposer of the present invention may have one or more features for optically coupling an optical component to a fiber, features for providing passive alignment of the fiber and/or optical component, and electrical/optical interconnections for interconnecting the optical component with required circuitry and for interfacing the interposer with the higher level flex circuit or printed circuit board.

Figure 6A:
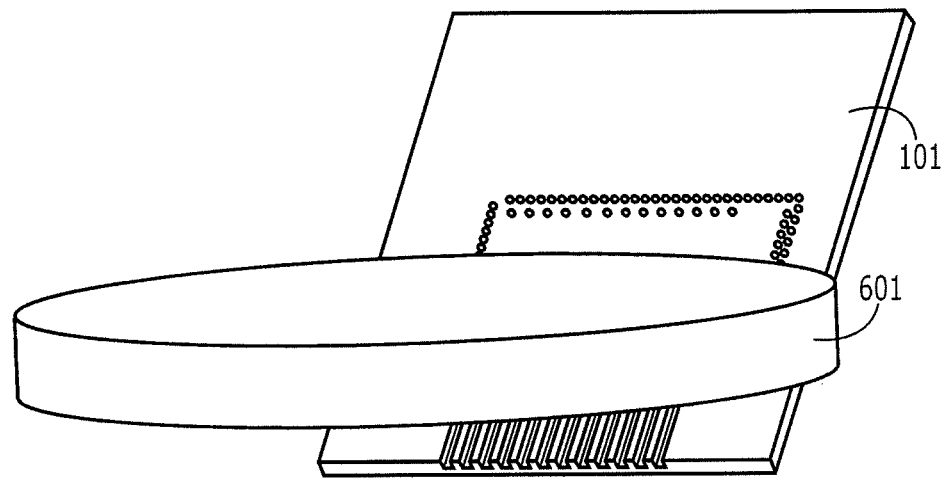
FIG. 6a shows one embodiment of machining the angled surface of the substrate of FIG. 1 using a dicing wheel.

Referring to FIG. 6a, one embodiment of the method of the present invention for forming a common angled surface and an interposer is shown. Specifically, a dicing wheel 601 which is typically used to dice silicon chips from a wafer is used to define the common angled surface 104 and the substrate 101. In one embodiment, the process involves moving the dicing wheel 601 relative to the substrate 101 such that it crosses the terminal ends of the grooves 102 as shown in FIG. 6a. In the embodiment of FIG. 6a, the edge 602 of the dicing wheel 601 is a right angle as shown in detail in FIG. 6b. Accordingly, to form a 45° facet in the substrate 101, the dicing wheel 601 is held at a 45° relative to the substrate 101 such that the edge 602, shown in detail in FIG. 6c, machines two facets 603 and 604 at right angles to each in the substrate 101. In this embodiment, the facet 604 is the angled surface 104 shown in FIG. 1.

Figure 6B:
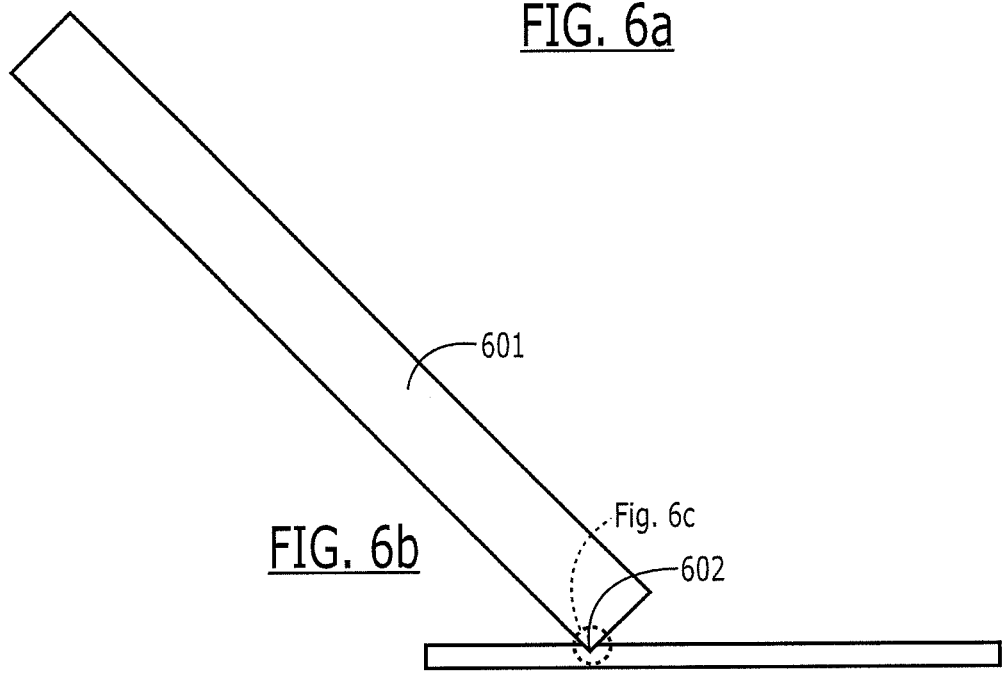
Figure 7A:
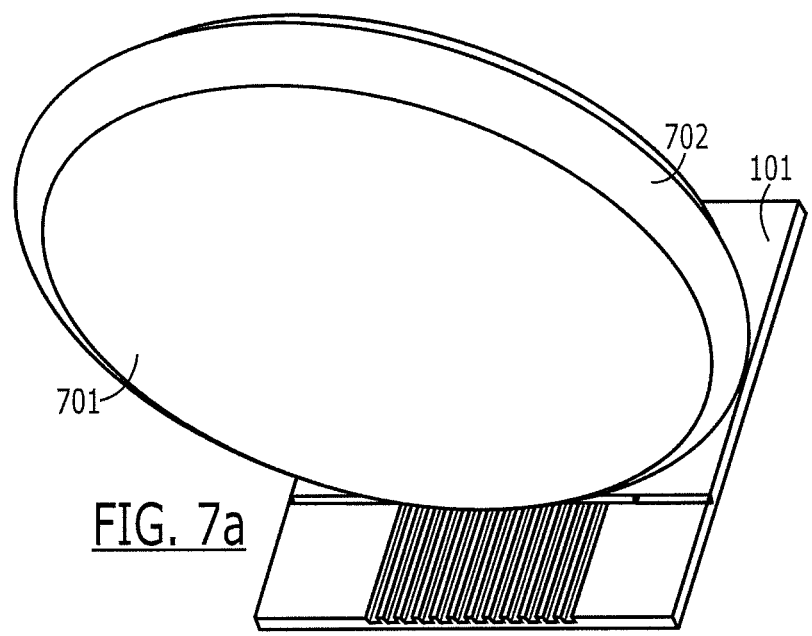
FIG. 7a shows an alternative embodiment of a chamfered dicing wheel.

Referring to FIG. 7a, an alternative embodiment of the method of machining the common angled surface into the substrate 101 is shown. In this embodiment, the edge 702 of the dicing wheel 701 is chamfered at approximately 45°. Because the edge 702 is chamfered, the wheel 701 need not be held at a 45° relative to the substrate 101 (as shown in FIG. 6b), but rather is held essentially perpendicular to substrate when moving across the grooves to define the angled surface 104. In FIG. 6b, one embodiment chamfered edge 702 of the dicing wheel 701 is shown. In this embodiment, the wheel is chamfered on both sides to form a point. Such a configuration results in two facets 703 and 704 being defined in the substrate in which the facets 703 and 704 are essentially perpendicular to one another. In this embodiment, the facet 704 is the common angled surface. Referring to FIG. 7c, an alternative embodiment of the chamfered wheel 701 as shown in which there is just one 45° chamfer such that, the facets 703a and 704 in the substrate are not perpendicular, but rather at a 45° angle to one another. Again, in this embodiment, facet 704 is the common angled surface.

Figure 6C:
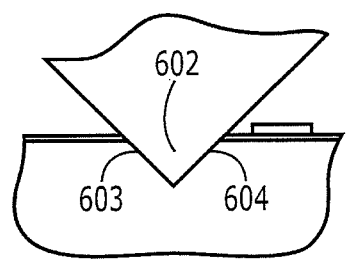
FIG. 6c shows a detailed view of the edge of the dicing wheel shown in FIG. 6b.
Figure 7B:
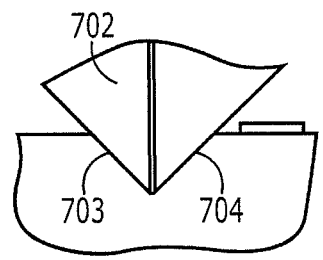
FIG. 7b shows a detailed side view of the chamfered dicing wheel cutting into a substrate.
Figure 7C:
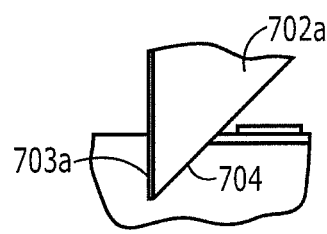
FIG. 7c shows an alternative embodiment of the chamfered dicing wheel cutting into a substrate.

Although FIGS. 6c, 7b and 7c show alternative embodiments of the machining techniques of the present invention, it should be understood that other techniques for machining a 45° angled surface into the substrate of the interposer will be known to one of skill in the art in light of this disclosure.

By machining a common angled surface across the grooves in one step, economies of scale are realized and continuity among the different angled surfaces is essentially guaranteed. In one embodiment, the angled surfaces are defined in the substrate prior to the substrate being diced from the wafer in which they are formed. In such an embodiment, the dicing wheel may cut across not only the grooves on a substrate, but cut across the grooves on different substrates in one process step. Again, further realizing economics of scale and reducing the cost and consistency of producing angled surfaces in the substrates.

Not only does the machining of a common angled surface allow for large-scale production, but also, in one embodiment, the interposer of the present invention has other features that lend itself to economical and highly repeatable manufacturing. In particular, most if not all of the critical alignment relationships may be defined on the wafer scale, often in just a few, or even a single, photolithography step. Specifically, the location of the grooves for holding the fiber and the contact pads for electrically connecting and providing passive alignment of the optical components may be defined in a single masking step. Additionally, in one embodiment, the optical/electrical interconnections among the various components may be defined in a single masking step. For example, the various traces interconnecting the pads for the optical component and the pads for the electrical driver circuitry, and the traces between the driver circuitry and the through substrate vias may be defined in a single masking step. In one embodiment, even the edges of the interposers are defined in the same masking step. In other words, each edge 120 of the interposer as shown in FIG. 1 is one half of a groove etched in the wafer. The wafer is simply parted at the bottom of each groove to form edges. This way, the distance from the edge 120 of the interposer to critical features such as the grooves 102 may be precisely controlled, often in a single step, thereby eliminating tolerance build up and simplifying assembly manufacturing with the interposer.

The etching may also be performed on wafer-scale. In one embodiment, the grooves, and the edges of the interposer are all defined and etched at the wafer-scale. Further economies may be realized by etching these features in the same photolithographic procedure. Although a single etching procedure may be used, in certain circumstances, two or more etching procedures may be beneficial.

It should be apparent from the above description that the interposer assembly of the present invention provides for significant advantages over conventional interposer configurations such as lower cost and simplicity in manufacturing and enhanced versatility with respect to the type of mating components with which it can effect optically coupling. Still other advantages of the interposer assembly are anticipated.

What is claimed is:

1. An interposer comprising:
   a plurality of optical conduits, each having an optical axis, wherein at least one of said optical conduits is a fiber having a substantially perpendicular end face;
   a substrate defining a plurality of grooves having a terminal end, each optical conduit being disposed in a single groove; and
   a common angled surface defined in said substrate and traversing two or more of said plurality of grooves at said terminal end, at least a portion of the angled surface proximate the optical axes of the optical conduits in said two or more grooves is reflective, wherein a lower edge of said angled surface is higher than the bottom of said two or more grooves, thereby defining a step at said terminal end of said two or more grooves;
   one or more optical components disposed above said angled surface, said optical components and said optical conduits being optically coupled by said angled surface; and
   said step having a register surface adjacent said angled surface at said terminal end of each groove, said register surface configured to abut said end face of said optical conduit to align said end face axially with respect to said angled surface.

2. The interposer of claim 1, wherein said angled surface traverses all of said plurality of grooves.

3. The interposer of claim 1, wherein said angled surface has a discrete reflective surface for each optical conduit.

4. The interposer of claim 1, wherein said angled surface has a common reflective surface for all optical conduits.

5. The interposer of claim 1, wherein said interposer has two parallel edges and said angled surface extends across said edges.

6. The interposer of claim 1, wherein one of said optical components corresponds to each optical conduit.

7. The interposer of claim 1, wherein said optical components are OEDs.

8. The interposer of claim 1, wherein said grooves are V-grooves.

9. A substrate for an interposer comprising:
   a plurality of grooves having a terminal end, each grove adapted for receiving an optical conduit, said optical conduit having a substantially perpendicular end face;
   a common angled surface defined in said substrate and traversing two or more of grooves of said plurality of grooves at said terminal end, at least a portion of the angled surface is treated to be reflective, wherein a lower edge of said angled surface is higher than the bottom of said two or more grooves, thereby defining a step at said terminal end of said two or more grooves; and
   said step having a register surface adjacent said angled surface at said terminal end of each groove, said register surface configured to abut said end face of said optical conduit to align said end face axially with respect to said angled surface.

10. The substrate of claim 9, wherein said angled surface traverses all grooves of said plurality of grooves.

11. The substrate of claim 9, wherein said angled surface has a discrete reflective surface for each optical conduit.

12. The substrate of claim 9, wherein said angled surface has a common reflective surface for all optical conduits.

13. The substrate of claim 9, wherein said substrate has two parallel edges and said angled surface extends across said edges.

14. The substrate of claim 9, wherein said grooves are V-grooves.

15. The substrate of claim 9, wherein said common angled surface is a portion of a V-groove defined in said substrate.

16. The interposer of claim 1, wherein said common angled surface is a portion of a V-groove defined in said substrate.

17. A substrate for an interposer comprising:
   at least one groove having a terminal end and adapted to receive an optical conduit having a substantially perpendicular end face;
   an angled surface defined in said substrate and traversing said at least one groove at said terminal end, at least a portion of said angled surface is treated to be reflective, wherein a lower edge of said angled surface is higher than the bottom of said at least one groove, thereby defining a step at said terminal end of each groove; and
   said step having a register surface adjacent said angled surface at said terminal end of said at least one groove, said register surface configured to abut said end face of said optical conduit to align said end face axially with respect to said angled surface.

18. The substrate of claim 17, wherein said at least one groove is a V-groove.

19. The substrate of claim 17, wherein said angled surface is a portion of a V-groove defined in said substrate.

* * * * *